United States Patent
Nge et al.

(10) Patent No.: US 10,204,068 B2
(45) Date of Patent: Feb. 12, 2019

(54) SERIAL BUS ELECTRICAL TERMINATION CONTROL

(71) Applicant: Intel Corporation, Santa Clara, CA (US)

(72) Inventors: Chee Lim Nge, Hillsboro, OR (US); Tod Schiff, Portland, OR (US); Vijayakumar Dibbad, Bangalore (IN); Alan Hallberg, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/901,351

(22) Filed: Feb. 21, 2018

(65) Prior Publication Data

US 2018/0181515 A1    Jun. 28, 2018

Related U.S. Application Data

(63) Continuation of application No. 15/419,443, filed on Jan. 30, 2017, now Pat. No. 9,916,272, which is a
(Continued)

(51) Int. Cl.
*G06F 3/00* (2006.01)
*G06F 13/38* (2006.01)
(Continued)

(52) U.S. Cl.
CPC .......... *G06F 13/385* (2013.01); *G06F 13/382* (2013.01); *G06F 13/4068* (2013.01); *G06F 13/4282* (2013.01)

(58) Field of Classification Search
CPC ............... G06F 13/385; G06F 13/4086; G06F 13/4282; G06F 13/382; G06F 13/4068; G06F 2213/0042
See application file for complete search history.

(56) References Cited

U.S. PATENT DOCUMENTS 6,076,119 A    6/2000   Maemura et al.
8,683,085 B1   3/2014   Castleberry et al.
(Continued)

FOREIGN PATENT DOCUMENTS

CN   106796564 A       5/2017
WO   WO-2004012090 A1  2/2004
WO   WO-2016048677 A1  3/2016

OTHER PUBLICATIONS

"U.S. Appl. No. 14/497,925, Advisory Action dated Aug. 24, 2016", 3 pgs.
(Continued)

*Primary Examiner* — Idriss N Alrobaye
*Assistant Examiner* — Richard B Franklin
(74) *Attorney, Agent, or Firm* — Schwegman Lundberg & Woessner, P.A.

(57) ABSTRACT

Some embodiments include apparatuses and methods having a node to couple to a serial bus, and a controller to provide a control signal to one of a first circuit path and a second circuit path in order to change electrical termination of a signal at the node between a first electrical termination through the first circuit path during a first mode of the controller and a second electrical termination through the second circuit path during a second mode of the controller. The controller can be arranged to provide the control signal to the first and second circuit paths during the first and second modes without providing another control signal from the controller to the first and second circuit paths during the first and second modes.

17 Claims, 5 Drawing Sheets

Related U.S. Application Data continuation of application No. 14/497,925, filed on Sep. 26, 2014, now Pat. No. 9,558,144.

(51) Int. Cl.
*G06F 13/40* (2006.01)
*G06F 13/42* (2006.01)

(56) References Cited

U.S. PATENT DOCUMENTS

| | | |
|---|---|---|
| 9,558,144 B2 | 1/2017 | Nge et al. |
| 9,916,272 B2 | 3/2018 | Nge et al. |
| 2003/0023804 A1 | 1/2003 | Matsuda et al. |
| 2004/0148451 A1 | 7/2004 | Lai et al. |
| 2007/0156293 A1 | 7/2007 | Kellzi et al. |
| 2015/0268688 A1 | 9/2015 | Leinonen et al. |
| 2016/0092393 A1 | 3/2016 | Nge et al. |
| 2017/0139864 A1 | 5/2017 | Nge et al. |

OTHER PUBLICATIONS

"U.S. Appl. No. 14/497,925, Final Office Action dated Jun. 15, 2016", 13 pgs.
"U.S. Appl. No. 14/497,925, Non Final Office Action dated Jan. 4, 2016", 12 pgs.
"U.S. Appl. No. 14/497,925, Notice of Allowance dated Sep. 23, 2016", 9 pgs.
"U.S. Appl. No. 14/497,925, Response filed Apr. 4, 2016 to Non Final Office Action dated Jan. 4, 2016", 17 pgs.
"U.S. Appl. No. 14/497,925, Response filed Aug. 15, 2016 to Final Office Action dated Jun. 15, 2016", 12 pgs.
"U.S. Appl. No. 14/497,925, Response filed Sep. 15, 2016 to Advisory Action dated Aug. 24, 2016", 8 pgs.
"U.S. Appl. No. 15/419,443, Non Final Office Action dated Apr. 3, 2017", 14 pgs.
"U.S. Appl. No. 15/419,443, Notice of Allowance dated Nov. 2, 2017", 7 pgs.
"U.S. Appl. No. 15/419,443, Response filed Jul. 27, 2017 to Non Final Office Action dated Apr. 3, 2017", 8 pgs.
"International Application Serial No. PCT/US2015/049431, International Preliminary Report on Patentability dated Apr. 6, 2017", 11 pgs.
"International Application Serial No. PCT/US2015/049431, International Search Report dated Dec. 15, 2015", 3 pgs.
"International Application Serial No. PCT/US2015/049431, Written Opinion dated Dec. 18, 2015", 9 pgs.
"Universal Serial Bus Type-C Cable and Connector Specification", Hewlett-Packard Development Company, [Online], Retrieved from the Internet: <URL: <http://www.those.ch/designtechnik/wp-content/uploads/2014/08/USB-Type-CSpecification-Release-1.0.pdf>, (Aug. 11, 2014), 171 pgs.
"European Application Serial No. 15844835.7, Extended European Search Report dated Aug. 27, 2018", 10 pgs.

SERIAL BUS ELECTRICAL TERMINATION CONTROL

CROSS-REFERENCE TO RELATED APPLICATION

This application is a continuation of U.S. patent application Ser. No. 15/419,443, filed Jan. 30, 2017, which is a continuation of U.S. patent application Ser. No. 14/497,925, filed Sep. 26, 2014, now issued as U.S. Pat. No. 9,558,144, each of which are incorporated by reference herein in their entirety.

TECHNICAL FIELD

Embodiments described herein pertain to electronic data communication. Some embodiments relate to Universal Serial Bus (USB) communication.

BACKGROUND

A serial bus connection (e.g., USB cable) is one of different types of connections that allow communication between electrical systems or devices. Some systems (e.g., personal computers) may include a serial bus controller that can be configured to operate in different roles at different times. For example, some USB controllers may be configured to operate as a dual-role USB controller, such as a USB host role and a USB device role. In according with USB specification, a signal at a certain pin of a USB connector is required to have a specific electrical termination, depending on which role the USB controller coupled to the USB connector operates. If the electrical termination required by USB specification is poorly implemented in a device or system, control logic for the USB controller of the device or system, circuit board layout, or both may be complicated.

DETAILED DESCRIPTION

Figure 1:
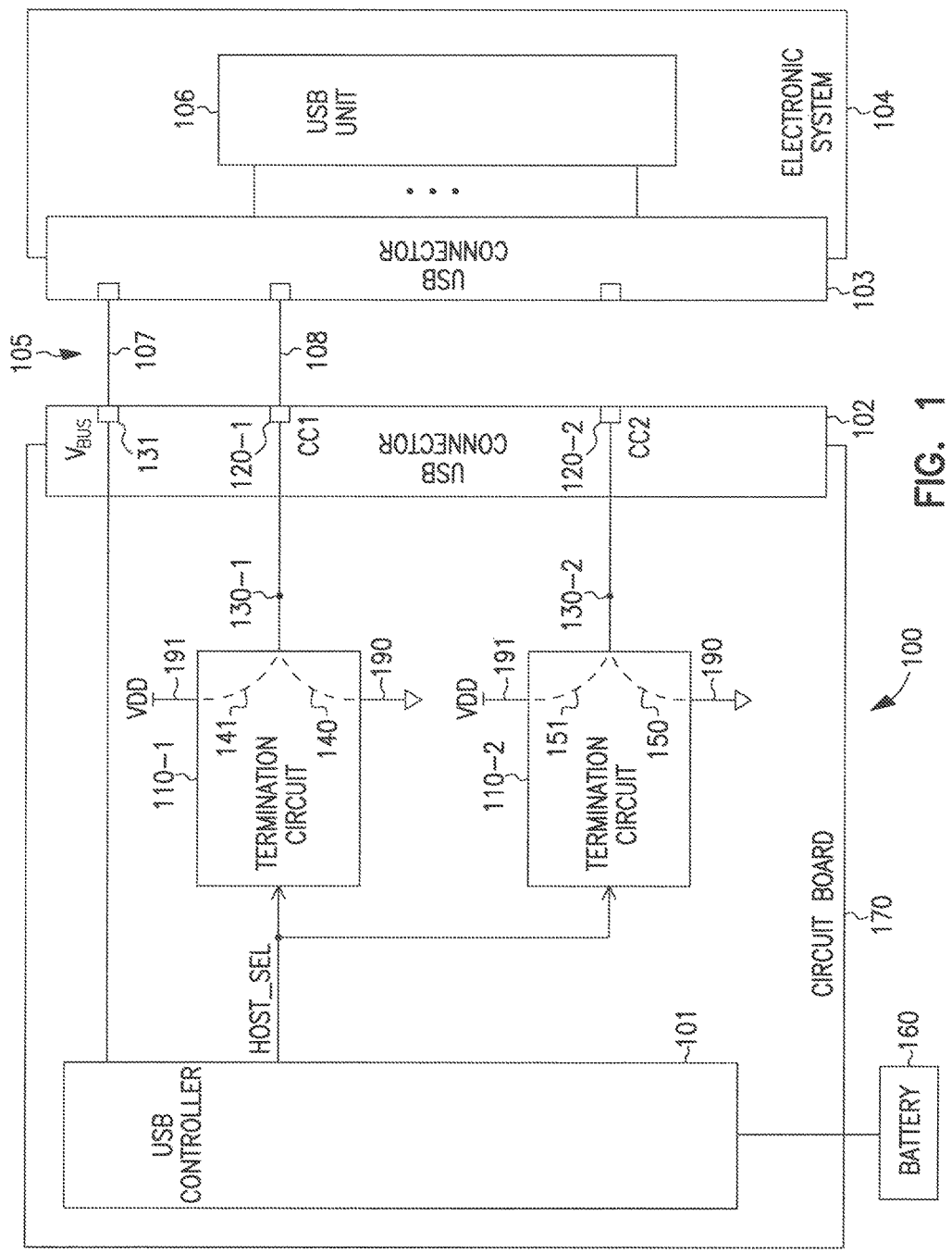
FIG. 1 shows an apparatus including a USB controller and termination circuits, according to some embodiments described herein.

FIG. 1 shows an apparatus 100 including a USB controller 101 and termination circuits 110-1 and 110-2, according to some embodiments described herein. Apparatus 100 can include or be included in an electronic communication device or system, such as a computer (e.g., notebook, laptop, or table), a cellular phone, or other electronic communication devices or systems. USB controller 102 and termination circuits 110-1 and 110-2 can be arranged (e.g., configured) to operate in accordance with USB specification.

USB specification described herein refers to all USB specifications published by USB Implementers Forum Inc. in San Francisco, Calif., including USB 3.1 Specification Revision 1.0, published on Jul. 16, 2013; USB Power Delivery Specification Revision 2.0, published on Aug. 11, 2014; and USB Type-C Cable and Connector Specification Revision 1.0, published on Aug. 11, 2014.

As shown in FIG. 1, apparatus 100 can include a USB connector 102 to allow it to couple to and communicate (e.g., exchange electrical signals) with another electronic device or system in accordance with USB specification. For example, USB connector 102 can be coupled to a USB connector 103 of electronic system 104 through a USB connection (e.g., USB cable) 105. Electronic system 104 can include a USB unit 106 (e.g., a USB host, USB device, or USB dual-role host and device) that can operate in accordance with USB specification. Although not shown in FIG. 1, USB unit 106 may include a USB controller and termination circuits that are similar to, or identical to, USB controller 101 and termination circuits 110-1 and 110-2 of apparatus 100.

Each of USB connectors 102 and 103 can include a USB Type-C connector, a USB Type-C adapter, or another type of connector or adapter compatible with a USB Type-C connector.

USB connection 105 can include a combination of USB Type-C connectors (not shown for simplicity) and wires (e.g., copper wires) to allow it to couple to (e.g., mate with) USB connectors 102 and 103. For simplicity, only two wires 107 and 108 of USB connection 105 are shown in FIG. 1. USB connection 105 includes other wires (not shown) for conducting signals (e.g., D+, D−, ground, etc.) in accordance with USB specification. In the example of FIG. 1, wire 107 can be used to carry power (e.g., voltage $V_{BUS}$) between USB connectors 102 and 103. Wire 108 can be used to carry Configuration Channel (CC) information (e.g., CC signal) in accordance with USB Type-C Cable and Connector Specification.

As shown in FIG. 1, USB connector 102 can include pins 120-1, 120-2, and 131. USB connector 102 also includes other pins (not shown) for conducting signals (e.g., D+, D−, ground, etc.) in accordance with USB specification. In FIG. 1, pin 131 can correspond to $V_{BUS}$ pin of a USB Type-C connector and can be coupled to wire 107 of USB connection 105 to provide power to or receive power from USB unit 106. Pins 120-1 and 120-2 can correspond to CC1 and CC2 pins, respectively, of a USB Type-C connector (e.g., USB Type-C receptacle). Each of pins 120-1 and 120-2 can be referred to as a Configuration Channel pin (CC pin).

Connector 102 can be arranged such that either pin 120-1 or pin 120-2, but not both, can be coupled to the Configuration Channel (e.g., wire 108) of a USB connection (e.g., USB connection 105) as specified by USB Type-C Cable and Connector Specification. FIG. 1 shows an example where pin 120-1 is coupled to the Configuration Channel (e.g., wire 108) of USB connection 105 and pin 120-2 is not coupled to the Configuration Channel of USB connection 105. However, in another example, pin 120-2 can be coupled to the Configuration Channel of USB connection 105 and pin 120-1 is not coupled to the Configuration Channel of USB connection 105.

Apparatus 100 can include nodes 130-1 and 130-2 coupled to pins 120-1 and 120-2, respectively, of USB connector 102. The signals at nodes 130-1 and 130-2 are the same as the signals at pins 120-1 and 120-2, respectively.

Depending on which mode (e.g., USB host mode or USB device mode) that USB controller 101 operates (as described in more detail below), the signals at nodes 130-1 and 130-2 can be terminated to a supply node 191 (e.g., terminate to voltage VDD in USB host mode) or to a supply node 190 (e.g., terminate to ground in USB device mode).

Termination circuit 110-1 can be arranged to provide different electrical terminations for the signal at node 130-1. For example, termination circuit 110-1 can terminate the signal at node 130-1 to supply node 191 through a circuit path 141 or to supply node 190 through a circuit path 140. Circuit path 141 can include a resistor (e.g., a pull-up resistor) between node 130-1 (e.g., CC1 pin) and supply node 191. Circuit path 140 can include a resistor (e.g., a pull-down resistor) between node 130-1 and supply node 190.

Termination circuit 110-2 can be arranged to provide different electrical terminations for the signal at node 130-2. For example, termination circuit 110-2 can terminate the signal at node 130-2 to supply node 191 through a circuit path 151 or to supply node 190 through a circuit path 150. Circuit path 151 can include a resistor (e.g., a pull-up resistor) between node 130-2 (e.g., CC2 pin) and supply node 191. Circuit path 150 can include a resistor (e.g., a pull-down resistor) between node 130-2 and supply node 190.

Termination circuits 110-1 and 110-2 can be controlled by the same control signal HOST_SEL and can include similar, or identical, elements (e.g., transistors, diodes, and resistors, which are not shown in FIG. 1).

USB controller 101 can generate control signal HOST_SEL and use it to control termination circuits 110-1 and 110-2 in order to control (e.g., change) electrical terminations of the signals at nodes 130-1 and 130-2. USB controller 101 (that can be included in a USB unit of apparatus 100) can be arranged to operate in different modes (e.g., different USB roles). For example, USB controller 101 can operate as a USB host (e.g., as a USB Downstream Facing Port (DFP)) at one time and as a USB device (e.g., as a USB Upstream Facing Port (UFP)) at another time. Thus, USB controller 101 can be arranged to operate as a USB dual-role (USB host and device), such as USB dual-role port (DRP). USB controller 101 can use control signal HOST_SEL to cause termination circuits 110-1 and 110-2 to change electrical terminations of the signals at nodes 130-1 and 130-2, depending on which mode USB controller 101 operates.

For example, USB controller 101 can use control signal HOST_SEL to cause termination circuits 110-1 and 110-2 to terminate the signals at node 130-1 and 130-2 to supply node 191 if USB controller 101 operates as a USB host (e.g., USB host port). USB controller 101 can use control signal HOST_SEL to cause termination circuits 110-1 and 110-2 to terminate the signals at node 130-1 and 130-2 to supply node 190 if USB controller 101 operates as a USB device (e.g., USB device port).

As shown in FIG. 1, apparatus 100 can include a battery 160 to provide supply power to USB controller 101 and other parts of apparatus 100. USB controller 101 can be in a powered condition or in an unpowered condition. The powered and unpowered conditions in USB controller 101 can include powered and unpowered conditions in a USB unit (a USB host (e.g., DFP), a USB device (e.g., UFP), or USB dual-role port (DRP)) in accordance with USB specification.

In FIG. 1, for example, the powered condition of USB controller 101 can occur when the level of battery 160 is at a sufficient (e.g., normal) level (e.g., 3.3V or 5.5V) that allows USB controller 101 to operate (e.g., as USB host or device) in accordance with USB specification. In the powered condition, USB controller 101 can control electrical terminations at nodes 130-1 and 130-2 in order to allow it to operate as a USB host or a USB device, as described above.

The unpowered condition of USB controller 101 can occur when battery 160 is dead (or deemed to be dead) or when battery 160 is in a dead battery state. The dead battery state may occur when the power level of battery 160 is zero or is less than a selected value (e.g., predetermined value). The dead battery state may also occur when the value of voltage VDD at supply node 191 is zero or less than a selected value (e.g., predetermined value). For example, if voltage VDD has a normal voltage of 3.3V, the dead battery state may occur when the value of voltage VDD is less than 2V. USB controller 101 may enter (e.g., or may be in) a dead battery state when it is in an unpowered condition.

USB controller 101 (or apparatus 100) can be arranged to receive power from another device or system (e.g., electronic system 104) when USB controller 101 is in an unpowered condition. Termination circuits 110-1 and 110-2 can to allow USB unit 106 to detect connection (e.g., the presence) of USB controller 101 (or apparatus 100) when USB controller 101 (or apparatus 100) is in an unpowered condition. This allows USB unit 106 to provide power to USB controller 101. USB controller 101 may use the power provided by USB unit 106 to charge battery 160. USB controller 101 may switch from the unpowered condition (e.g., a dead battery state) to the powered condition when battery 160 is charged to a sufficient level.

Termination circuits 110-1 and 110-2 can be arranged such that USB unit 106 can treat USB controller 101 as a USB device (e.g., UFP) when USB unit 106 detects connection of USB controller 101 and USB controller 101 is in an unpowered condition. This allows USB unit 106 to operate as a USB host (e.g., DFP) and provide power to USB controller 101. USB unit 106 can detect connection of USB controller 101 and treat it as a USB device if the voltage on the Configuration Channel (e.g., on wire 108) of USB connection 105 is less than an unterminated voltage of USB unit 106 voltage (e.g., less than voltage VDD as specified by USB specification). Termination circuits 110-1 and 110-2 are arranged such that the voltage at each of nodes 130-1 and 130-2 can be less than the unterminated voltage of USB unit 106 when USB unit 106 is coupled to connector 102 and USB controller 101 is in an unpowered condition. For example, termination circuits 110-1 and 110-2 can terminate the signals at nodes 130-1 and 130-2 to supply node 190 to cause the voltage on the Configuration Channel (e.g., pin 120-1 or 120-2) to be less than the unterminated voltage of USB unit 106 when USB unit 106 is coupled to connector 102 and USB controller 101 is in an unpowered condition.

As shown in FIG. 1, apparatus 100 may include a circuit board 170. USB controller 101 can include or be included in an integrated circuit (IC) chip (e.g., a semiconductor chip or IC package) that can be attached (e.g., mounted on) to circuit board 170.

FIG. 1 shows an example where termination circuits 110-1 and 110-2 are located on circuit board 170 and outside USB controller 101. In an alternative arrangement, at least a portion of each of termination circuits 110-1 and 110-2 can be included in USB controller 101. For example, a portion of termination circuit 110-1, a portion of termination circuit 110-2, or both can be included in the same chip with USB controller 101. In another example, the entire termination circuit 110-1, 110-2, or both, can be included in the same chip with USB controller 101.

The above description uses USB communication technique as an example. The embodiments described herein may also apply to other communication techniques besides USB communication technique. For example, the embodiments described herein may apply to electronic systems (or devices) that may communicate with each other in accordance with another type of serial bus specification different from USB specification.

Each of termination circuit 110-1 and 110-2 described above may include embodiments of the termination circuits described below with reference to FIG. 2 through FIG. 4.

Figure 2:
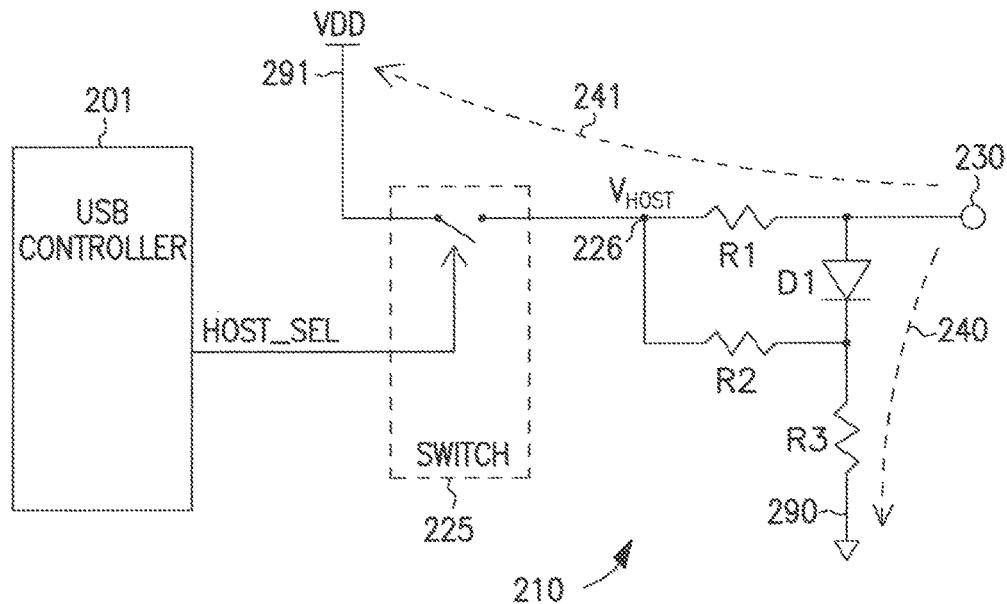
FIG. 2 shows a schematic diagram of a termination circuit to provide electrical termination to a signal at a node, according to some embodiments described herein.

FIG. 2 shows a schematic diagram of a termination circuit 210 to provide electrical termination to a signal at a node 230, according to some embodiments described herein. Termination circuit 210 can be used as (or can correspond to) termination circuit 110-1 or 110-2 of FIG. 1. Node 230 of FIG. 2 can corresponds to node 130-1 or 130-2 of FIG. 1. Thus, node 230 of FIG. 2 can be arranged to couple to a Configuration Channel of a USB connection (e.g., USB connection 105 of FIG. 1). For example, node 230 of FIG. 2 can be coupled to Configuration Channel of a USB connection through a CC1 pin or a CC2 pin of a USB Type-C connector, such as USB connector 102 of FIG. 1.

Termination circuit 210 in FIG. 2 can receive control signal HOST_SEL generated by a USB controller 201, which can correspond to USB controller 101 of FIG. 1. Termination circuit 210 can respond to control signal HOST_SEL to provide different electrical terminations for the signal at node 230 to allow USB controller 201 to operate in different modes (e.g., USB host mode or USB device mode). In FIG. 2, termination circuit 210 can include a supply node 291 to receive a voltage VDD (e.g., a positive supply rail voltage) and a supply node 290 that can be coupled to ground. Supply nodes 290 and 291 can be coupled to a battery (e.g., battery 160 of FIG. 1).

Termination circuit 210 can terminate the signal at node 230 to supply node 291 through a circuit path 241 if USB controller 201 operates in USB host mode (e.g., operates as a USB host). Termination circuit 210 can terminate the signal at node 230 to supply node 290 through a circuit path 240 if USB controller 201 operates in USB device mode (e.g., operates as a USB device).

As shown in FIG. 2, termination circuit 210 can include a switch 225, a diode D1, and resistors R1, R2, and R3. Resistor R1 can be included in circuit path 241. Diode D1 and resistor R3 can be included in circuit path 240. As shown in FIG. 2, diode D1 and resistor R3 can be coupled in series directly between node 230 and supply node 290.

In a powered condition of USB controller 201, the signal at node 230 can be terminated to supply node 291 to allow USB controller 201 to operate in USB host mode. In this USB host mode, USB controller 201 can drive control signal HOST_SEL to a level (e.g., logic one level) in order to turn on switch 225. This can couple node 226 to supply node 291 through switch 225, such that a voltage $V_{HOST}$ at node 226 can be voltage VDD (e.g., 3.3V). Diode D1 is reversed biased (because of the connection of resistor R2). Thus, node 230 is not coupled to supply node 290 through R3. The signal at node 230 is terminated (e.g., pulled up) to voltage $V_{HOST}$ (or voltage VDD at node 291) through resistor R1. This allows USB controller 201 to operate in USB host mode.

In a powered condition of USB controller 201, the signal at node 230 can be terminated to supply node 290 to allow USB controller 201 to operate in USB device mode. In this USB device mode, USB controller 201 can drive control signal HOST_SEL to a level (e.g., logic zero level) in order to turn off switch 225. When switch 225 is turned off, node 226 is decoupled from supply node 291 and has high impedance to ground. When a USB unit (e.g., USB unit 106 in FIG. 1) is coupled to node 230 through Configuration Channel of a USB connection (e.g., through wire 108 in FIG. 1), the voltage (e.g., supply voltage such as VDD) from the USB unit applied to node 230 can cause diode D1 to be forward biased. The signal at node 230 can be terminated (e.g., pulled down) to ground at node 290 through resistor R3. This allows USB controller 201 to operate in USB device mode.

In an unpowered condition of USB controller 201, termination circuit 210 can allow another USB unit (e.g., USB unit 106 of FIG. 1) to detect connection (e.g., the presence) of USB controller 201 (or apparatus 100) and provide power to USB controller 201. In the unpowered condition, control signal HOST_SEL can be at zero volts. Thus, switch 225 is turned off. Node 226 has high impedance to ground. The voltage VDD at node 291 may have a value of zero volts (e.g., USB controller 201 is in a dead battery state). When a USB unit (e.g., USB unit 106 in FIG. 1) is coupled to node 230 through a Configuration Channel of a USB connection (e.g., through wire 108 in FIG. 1), the voltage (e.g., supply voltage such as VDD) from the USB unit applied to node 230 can cause diode D1 to be forward biased. The signal at node 230 can be terminated (e.g., pulled down) to ground at node 290 through resistor R3. This allows the USB unit to detect connection of USB controller 201 and provide power to USB controller 201.

Thus, as described above, the same circuit path 240 may allow termination of the signal at node 230 to supply node 290 (through circuit path 240) in both powered and unpowered conditions. This may reduce the number of circuit elements in termination circuit 210, simplify logic control in USB controller 201, or both.

In FIG. 2, voltage VDD, resistors R1 and R3 can have values to allow termination circuit 210 to provide electrical termination to the signal at node 230 (e.g., CC1 or CC2 pin of a USB Type-C connector) in accordance with USB specification. For example, voltage VDD can have a value of 3.3V or 5V. Resistors R1 and R3 can have values of 36K ohms and 5.1K ohms, respectively. Resistor R2 can have a value significantly less than that of resistor R1. For example, resistor R2 can have a value of approximately 100 ohms. Diode D1 can include a Schottky diode. Switch 225 can include one or more transistors, such as p-channel transistors, n-channel transistors, or a combination of both.

In some applications, a driver (e.g., a tri-state driver) of a power delivery (PD) controller (not shown in FIG. 2) may drive a signal (e.g., power delivery baseband signal) on node 230. Such a signal at node 230 can swing between 75 mV (e.g., logic zero) and 1050 mV (e.g., logic one). Such a signal driven by the PD controller can include USB PD Bi-phase Mark Coded communication as defined in USB Power Delivery Specification Revision 2.0, Aug. 11, 2014. USB PD communication is used to establish power contracts between USB devices or systems (e.g., power contracts between apparatus 100 to electronic system 104 in FIG. 1) defined by USB 2.0 and USB 3.1 specifications. USB PD communication is also used to swap the DFP and UFP roles, and to communicate with the USB cable (e.g., USB connection 105 in FIG. 1). The PD controller described herein can be included in an apparatus (e.g., apparatus 100) that includes controller 201 and termination circuits 210. This PD controller (included the apparatus that includes controller 201 and termination circuits 210) may be configured to communicate with another PD controller (e.g., another USB PD controller) in an external system (e.g., electronic system 104) to establish bidirectional PD communication with the external system in accordance with USB Power Delivery Specification.

In FIG. 2, the arrangement of diode D1 and resistor R3 in circuit path 240 allows such a signal (e.g., power delivery baseband signal) to be driven on node 230 without requiring USB controller 201 to be in powered condition. For example, because of the arrangement of circuit path 240, the voltage at node 230 may not be clamped to a value (e.g., a value close to 1050 mV) that may present driving of that signal on node 230. Thus, in addition to providing appropriate electrical termination for the signal at node 230 when USB controller 201 is in an unpowered condition, circuit path 240 may also allow driving of a signal that may swing between logic zero and logic one. As shown in FIG. 2, circuit path 240 may include only a diode (e.g., diode D1) and a resistor (e.g., resistor R3) and may not include a transistor. Thus, USB controller 201 may provide only control signal HOST_SEL to control switch 225 in circuit path 241 in order to control (e.g., change) electrical termination for the signal (e.g., Configuration Channel signal) at node 230 during both USB host and device modes, without providing another control signal (e.g., a second control signal) to circuit paths 240 and 241 during both USB host and device modes.

As described above, USB controller 201 may use only one control signal (e.g., HOST_SEL) during both USB host and device modes to control termination circuit 210 in order to change electrical termination of the signal at node 230. For example, as described above, electrical termination of the signal at node 230 can be changed between electrical termination to supply node 291 (e.g., voltage VDD) and electrical termination to supply node 290 (e.g., ground).

Using only one such control signal (instead of multiple control signals) during both USB host and device modes may simplify implementation (e.g., simplify control logic) for USB controller 201. USB controller 201 may include (e.g., may be formed in or on) an IC chip (e.g., a semiconductor chip or IC package). The single signal (e.g., HOST_SEL), as described above, may reduce (or save) the number of pins of the chip (e.g., IC package) that include USB controller 201. This may reduce chip size, chip cost, and/or allow room for additional pin (or pins) of the chip for other function. Since only one control signal (e.g., HOST_SEL) is used, circuit board area may also be reduced.

Figure 3:
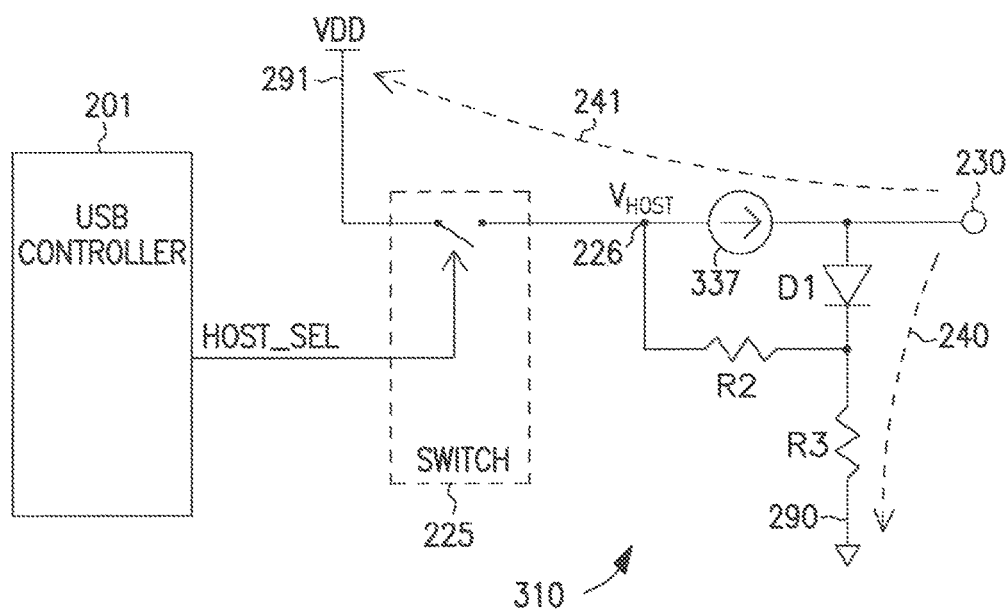
FIG. 3 shows a schematic diagram of a termination circuit that can be a variation of the termination circuit of FIG. 2, according to some embodiments described herein.

FIG. 3 shows a schematic diagram of a termination circuit 310 that can be a variation of termination circuit 210 in FIG. 2, according to some embodiments described herein. Termination circuit 310 can include elements similar to, or identical to, those of termination circuit 210. Thus, for simplicity, the description of similar or identical elements between termination circuit 210 and 310 is not repeated in the description of termination circuit 310. As shown in FIG. 2 and FIG. 3, differences between circuits 210 and 310 can include a current source 337 in termination circuit 310 of FIG. 3. Current source 337 can replace resistor R1 of termination circuit 210 of FIG. 2.

Termination circuit 310 can be used as termination circuit 110-1 or 110-2 of FIG. 1. The operation of USB controller 201 and termination circuit 310 in powered and unpowered conditions can be similar to those described above with reference to FIG. 2. In FIG. 3, for example, to operate in USB host mode, switch 225 can be turned on to provide voltage $V_{HOST}$ at node 226 with a value (e.g., 1.7V to 5.5V) sufficient to power current source 337 and cause diode D1 to be reversed biased. This allows the signal at node 230 of termination circuit 310 to be terminated to supply node 291 in order to allow USB controller 201 of termination circuit 310 to operate in USB host mode.

To operate in USB device mode, switch 225 of termination circuit 310 can be turned off. Node 226 has high impedance to ground. When a USB unit (e.g., a USB host) is connected to node 230, diode D1 can be forward biased. The signal at node 230 is pulled down to ground through resistor R3. This allows the signal at node 230 of termination circuit 310 of FIG. 3 to be terminated to supply node 290 of termination circuit 310 in order to allow USB controller 201 of termination circuit 310 to operate in USB device mode.

Figure 4:
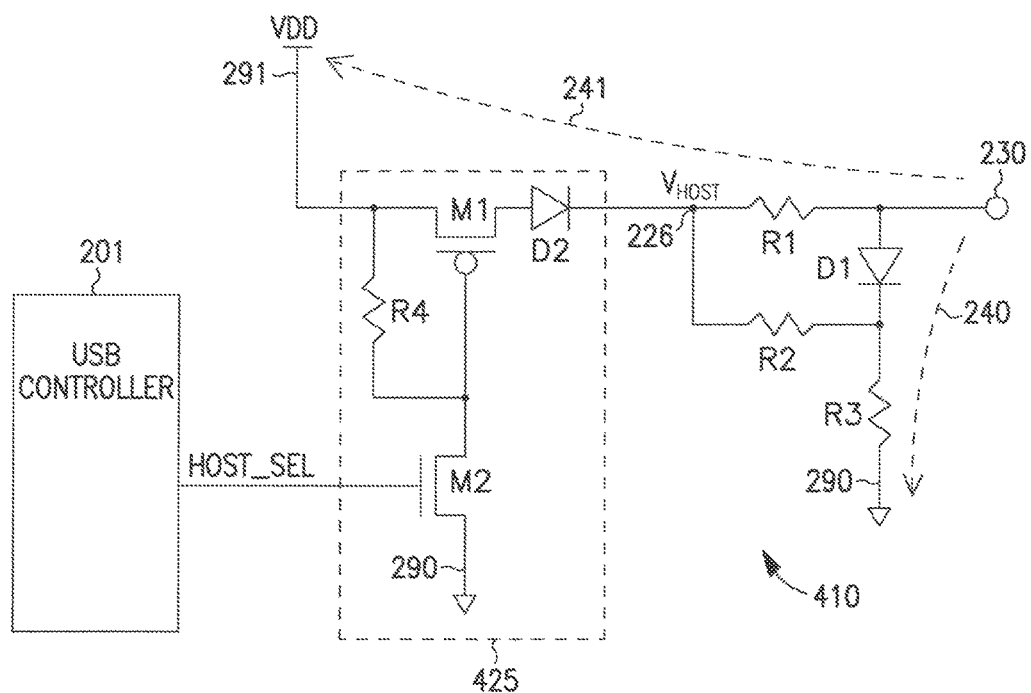
FIG. 4 shows a schematic diagram of a termination circuit including details of a switch, according to some embodiments described herein.

FIG. 4 shows a schematic diagram of a termination circuit 410 including details of a switch 425, according to some embodiments described herein. Termination circuit 410 can include elements similar to, or identical to, those of termination circuit 210. Thus, for simplicity, the description for similar or identical elements between termination circuit 210 and 410 is not repeated in the description of termination circuit 410. As shown in FIG. 2 and FIG. 4, differences between circuits 210 and 310 include details of switch 425 of termination circuit 410 of FIG. 4.

Switch 425 can include a transistor (e.g., a p-channel transistor) M1, a transistor (e.g., an n-channel transistor) M2, a resistor R4, and a diode D2 (which can include a Schottky diode).

Termination circuit 310 can be used as termination circuit 110-1 or 110-2 of FIG. 1. In FIG. 4, the signal at node 230 can terminated to supply node 291 to allow USB controller 201 to operate in USB host mode when USB controller is in a powered condition. The signal at node 230 can terminated to supply node 290 to allow USB controller 201 to operate in USB device mode when USB controller is in a powered condition. In an unpowered condition, the signal at node 230 can also be terminated to supply node 290 to allow USB controller 201 to operate as a USB device to receive power from another USB unit.

In a powered condition, to operate in USB host mode, USB controller 201 in FIG. 4 can drive control signal HOST_SEL to a level (e.g., logic one level) in order to turn on transistor M2. This also turns on transistor M1. Diode D2 is forward biased. Node 226 is coupled to supply node 291. Thus, voltage $V_{HOST}$ at node 226 can be voltage VDD (e.g., 3.3V). Diode D1 is reversed biased. Thus, node 230 is not coupled to supply node 290. The signal at node 230 is pulled up to voltage $V_{HOST}$ (or voltage VDD at node 291) through resistor R1 in order to allow USB controller 201 of termination circuit 410 to operate in USB host mode.

In a powered condition, to operate in operate in USB device mode, USB controller 201 of termination circuit 410 can drive control signal HOST_SEL to a level (e.g., logic zero level) in order to turn off transistor M2. Transistor M1 is also turned off. Diode D2 is reversed biased. Node 226 is decoupled from supply node 291 and has high impedance to ground. When a USB unit (e.g., a USB host, such as USB unit 106 in FIG. 1) is connected to node 230, the voltage (e.g., VDD) from the USB unit applied to node 230 can cause diode D1 to be forward biased. The voltage at node 230 is pulled down to ground through resistor R3. This allows the signal at node 230 to be terminated to supply node 290 in order to allow USB controller 201 of termination circuit 410 to operate in USB device mode.

In an unpowered condition, USB controller 201 and termination circuit 410 can allow a USB unit (e.g., a USB host) to detect connection and provide power to USB controller 201. In an unpowered condition, control signal HOST_SEL can be at zero volts. Transistors M1 and M2 are turned off. Diode D2 blocks reverse current flow from node 230 to supply node 291. This may protect other components that use power provided by supply node 291 from operational failures. When transistors M1 is turned off, node 226 has high impedance to ground. When a USB unit is connected to node 230, the USB unit can detect the connection and provide power to USB controller 201.

FIG. 4 shows an example where the components (e.g., transistors M1 and M2, resistors R1, R2, R3, and R4, and diodes D1 and D2) of termination circuit 410 are located outside USB controller 201. In an alternative arrangement, a portion (some of the components) of termination circuit 410 can be included in (e.g., located on the same IC chip with) USB controller 201, and another portion of termination circuit 410 can be located on (e.g., soldered to) a circuit board (e.g., circuit board 170 of FIG. 1) and outside USB controller 201. In another alternative arrangement, all of the components of termination circuit 410 may be included in (e.g., located on the same IC chip with) USB controller 201.

As shown in FIG. 4, circuit paths 241 and 240 include only one transistor (e.g., transistor M1) between node 230 and one of supply nodes 290 and 291 (e.g., between node 230 and supply node 291). Including only one transistor M1 in circuit paths 240 and 241 may allow only one control signal (e.g., HOST_SEL) to control transistor M1 (e.g., by turning on or off transistor M2 using control signal HOST_SEL). This may simplify control logic in USB controller 201 (FIG. 4), reduce the number of pins (e.g., output pin) of an IC chip that include USB controller 201, or both.

As described above, diode D2 may protect other components that use power provided by supply node 219 from operational failures. However, the arrangement of transistor M1 on circuit path 241 in FIG. 4 may allow diode D2 to be omitted from termination circuit 410 without causing operational failures to other components that may use power from supply node 291. For example, without diode D2, the voltage across transistor M1 (e.g., voltage across forward biased body diode of transistor M1) may limit the voltage VDD to be at a value that may be acceptable to other components, such that operational failures may not occur.

Figure 5:
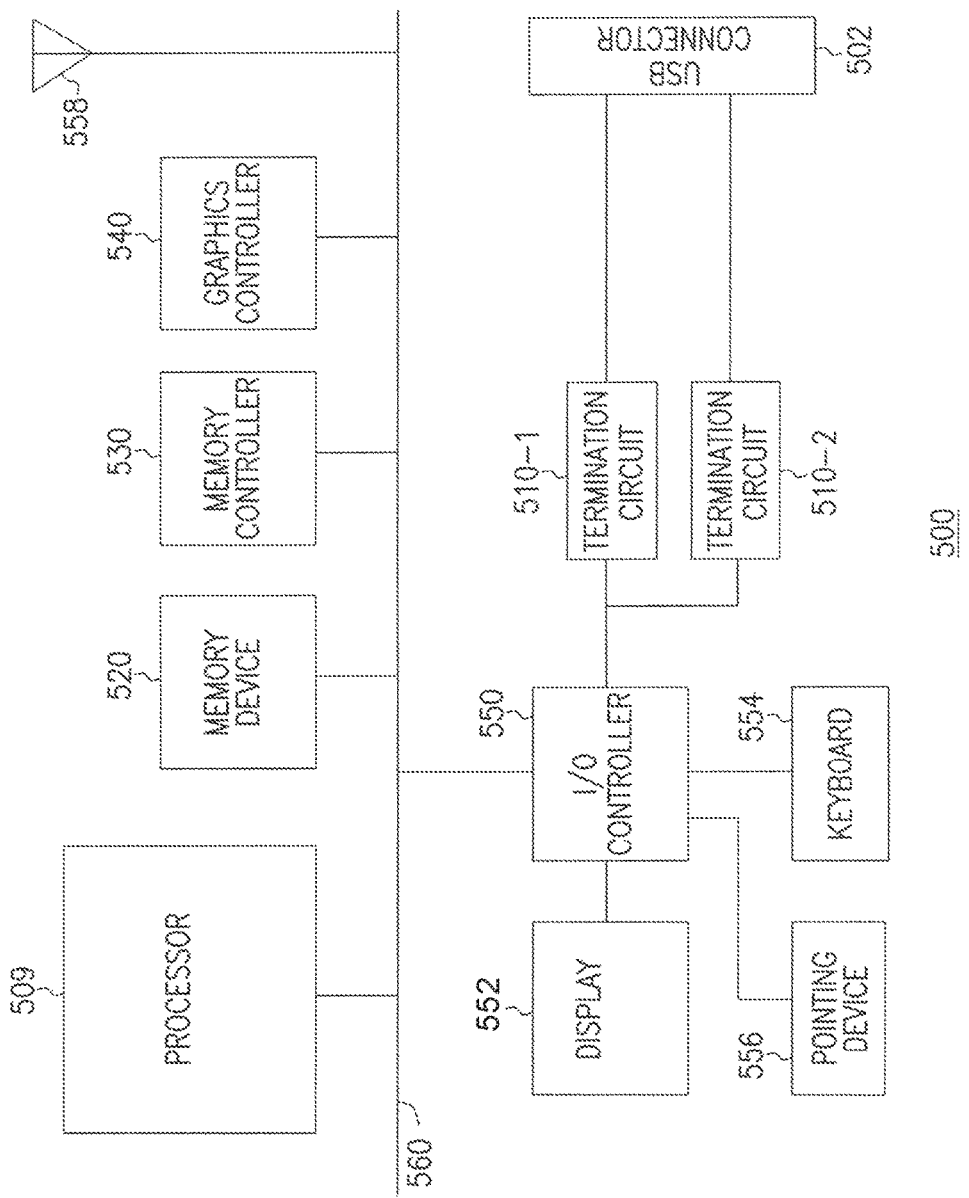
FIG. 5 shows an apparatus in the form of a system, according to some embodiments described herein.

FIG. 5 shows an apparatus in the form of an electronic communication system 500, according to some embodiments described herein. System 500 can include or be included in a computer, a cellular phone, or other electronic systems. As shown in FIG. 5, system 500 can include a processor 509, a memory device 520, a memory controller 530, a graphics controller 540, an input and output (I/O) controller 550, a display 552, a keyboard 554, a pointing device 556, at least one antenna 558, termination circuits 510-1 and 510-2, a USB connector 502, and a bus 560. In some arrangements, system 500 does not have to include any antenna. Thus, antenna 558 can be omitted from system 500.

Processor 509 may include a general-purpose processor or an application specific integrated circuit (ASIC).

Memory device 520 may include a dynamic random access memory (DRAM) device, a static random access memory (SRAM) device, a flash memory device, or a combination of these memory devices. FIG. 5 shows an example where memory device 520 is a stand-alone memory device separated from processor 509. In an alternative arrangement, memory device 520 and processor 509 can be located on the same die. In such an alternative arrangement, memory device 520 is an embedded memory in processor 509, such as embedded DRAM (eDRAM), embedded SRAM (eSRAM), embedded flash memory, or another type of embedded memory.

Display 552 can include a liquid crystal display (LCD), a touchscreen (e.g., capacitive or resistive touchscreen), or another type of display. Pointing device 556 can include a mouse, a stylus, or another type of pointing device.

I/O controller 550 can include a communication module for wired or wireless communication (e.g., communication through one or more antenna 558). Such wireless communication may include communication in accordance with WiFi communication technique, Long Term Evolution Advanced (LTE-A) communication technique, or other communication techniques.

I/O controller 550 can also include a module (e.g., a USB controller) to allow system 500 to communicate with other devices or systems in accordance with USB specification. For example, I/O controller 550 can include a USB controller, which can be any of the USB controllers (e.g., USB controller 101 or 201) described above with reference to FIG. 2 through FIG. 4.

Each of termination circuits 510-1 and 510-2 can include any of the termination circuits (e.g., 210, 310, and 410) described above with reference to FIG. 2 through FIG. 4. USB connector 502 can include USB connector 102 of FIG. 1. I/O controller 550 (which can include a USB controller) and termination circuits 510-1 and 510-2 can be arranged to operate in ways similar to, or identical, to those of any of the USB controllers and termination circuits described above with reference to FIG. 2 through FIG. 4.

FIG. 5 shows the components of system 500 arranged separated from each other as an example. In some arrangements, two or more components (processor 509, memory device 520, and I/O controller 550) of system 500 can be located on the same die (e.g., same IC chip) that forms a system-on-chip (SoC).

Figure 6:
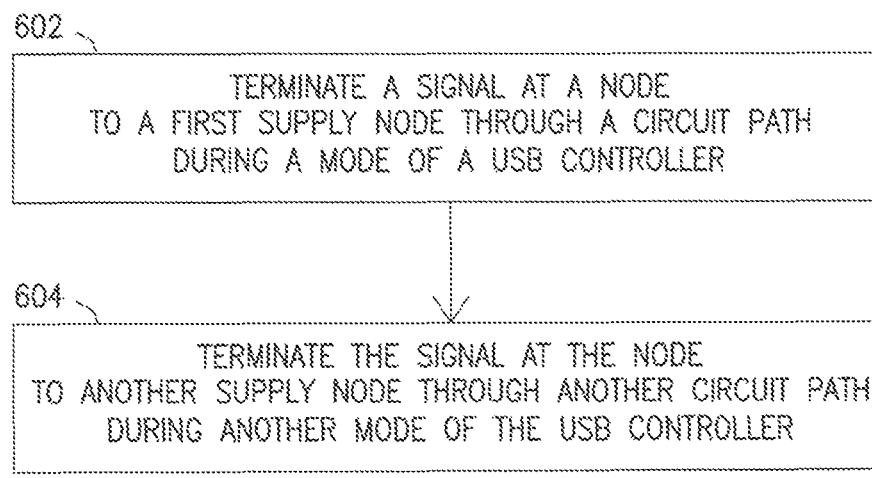
FIG. 6 is flowchart showing a method of operating a USB device or system, according to some embodiments described herein.

FIG. 6 is flowchart showing a method 600 of operating an electronic communication device or system, including a USB device or system, according to some embodiments described herein. The USB device or system used in method 600 can include a USB controller described above with reference to FIG. 1 through FIG. 5.

As shown in FIG. 6, activity 602 of method 600 can include terminating a signal at a node to a supply node (e.g., voltage VDD) through a circuit path during a mode (e.g., USB host mode) of the USB controller. The supply node and circuit path in activity 602 can include supply node 191 or 291 and circuit path 141 or 241 described above with reference to FIG. 2 through FIG. 4.

Activity 604 of method 600 can include terminating the signal at the node to another supply node (e.g., ground) through another circuit path during another mode (e.g., USB device mode) of the USB controller. The supply node and circuit path in activity 604 can include supply node 190 or 290 and circuit path 140 or 240 described above with reference to FIG. 2 through FIG. 4.

In activities 602 and 604, terminating the signal during the modes (e.g., both USB host and device modes) of the USB controller can include providing a control signal from the USB controller to the circuit paths during the modes of the USB controller to control at least one transistor in the circuit paths without providing another control signal from the USB controller to the circuit paths during the modes of the USB controller.

Method 600 can include fewer or more activities than activities 602 and 604 shown in FIG. 6. For example, method 600 can include activities and operations of apparatus 100, USB unit 106, USB controllers 101 and 201, I/O controller 550, termination circuits 110-1, 110-2, 210, and 410, and system 500, described above with reference to FIG. 1 through FIG. 5.

The illustrations of the apparatuses (e.g., apparatus 100 and system 500) and methods (e.g., operations of apparatus 100 and system 500, and method 600) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., notebook computers, laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

ADDITIONAL NOTES AND EXAMPLES

Example 1 includes subject matter (such as a device, apparatus, or machine) comprising a node to couple to a serial bus, and a controller to provide a control signal to one of a first circuit path and a second circuit path in order to change electrical termination of a signal at the node between a first electrical termination through the first circuit path during a first mode of the controller and a second electrical termination through the second circuit path during a second mode of the controller without providing another control signal from the controller to the first and second circuit paths during the first and second modes.

In Example 2, the subject matter of Example 1 may optionally include, wherein the serial bus includes a Universal Serial Bus (USB).

In Example 3, the subject matter of Example 1 may optionally include, wherein.

In Example 4, the subject matter of any of Example 1 through Example 3 may optionally include, wherein.

Example 5 includes subject matter (such as a device, apparatus, or machine) comprising a node to couple to a Configuration Channel of a Universal Serial Bus (USB) connection, a first circuit path to terminate a signal at the node to a first supply node, and a second circuit path including a diode and a resistor to terminate the signal at the node to a second supply node.

In Example 6, the subject matter of Example 5 may optionally include, wherein the diode is arranged to be reversed biased when the signal at the node is terminated to the first supply node.

In Example 7, the subject matter of Example 5 or Example 6 may optionally include, wherein the diode is arranged to be forward biased when the signal at the node is terminated to the second supply node.

In Example 8, the subject matter of Example 5 may optionally include, wherein the first circuit path includes a current source coupled between the node and the first supply node.

In Example 9, the subject matter of Example 5 may optionally include, wherein the first circuit path includes an additional diode coupled between the node and the first supply node.

In Example 10, the subject matter of Example 5 may optionally include, wherein the first supply node is arranged to couple to a positive voltage, and the second supply node is arranged to couple to ground.

In Example 11, the subject matter of any of Example 5 through Example 10 may optionally include, wherein the first and second circuit paths include only one transistor between the node and one of the first and second supply nodes.

Example 12 includes subject matter (such as a device, apparatus, or machine) comprising a node to couple to a Configuration Channel of a Universal Serial Bus (USB) connection to receive a signal, a USB controller to provide a control signal to one of a first circuit path and a second circuit path in order to change electrical termination of a signal at the node between a first electrical termination through the first circuit path during USB host mode of the USB controller and a second electrical termination through the second circuit path during USB device mode of the USB controller, wherein the USB controller is arranged to provide the control signal to the first and second circuit paths during the USB host and device modes without providing another control signal from the USB controller to the first and second circuit paths during the USB host and device modes, a processor coupled to the USB controller, and an antenna coupled to the processor In Example 13, the subject matter of Example 12 may optionally include, a USB connector having a first Configuration Channel (CC1) pin and a second Configuration Channel (CC2) pin, wherein the node is coupled to one of the CC1 and CC2 pins.

In Example 14, the subject matter of Example 12 or Example 13 may optionally include, wherein the second circuit path is arranged to terminate the signal at the node to the second supply node through a resistor included in the second circuit path when the USB controller is a powered condition, and the second circuit path is arranged to terminate the signal at the node to the second supply node through the resistor when the USB controller is in an unpowered condition.

In Example 15, the subject matter of any of Example 12 through Example 14 may optionally include, wherein one of the first and second circuit paths includes a transistor and a resistor, and at least one of the transistor and the resistor is included in the USB controller.

In Example 16, the subject matter of Example 12 may optionally include, a circuit board, wherein one of the first and second circuit paths includes a transistor and a resistor, and at least one of the transistor and the resistor is located on the circuit board.

In Example 17, the subject matter of Example 12 may optionally include, an additional node to couple to the Configuration Channel, and wherein the USB controller is arranged to provide the control signal to one of a third circuit path and a fourth circuit path in order to change electrical termination of a signal at the additional node between a third electrical termination through the third circuit path during the USB host mode and a fourth electrical termination through the fourth circuit path during the USB device mode, wherein the USB controller is arranged to provide the control signal to the third and fourth circuit paths during the USB host and device modes without providing another control signal from the USB controller to the third and fourth circuit paths during the USB host and device modes.

Example 18 includes subject matter including a method of operating an electronic communication apparatus, including a USB device or system, the method comprising terminating a signal at a node to a first supply node through a first circuit path during a first mode of a USB controller, and terminating the signal at the node to a second supply node through a second circuit path during a second mode of the USB controller, wherein terminating the signal during the first and second modes includes providing a control signal from the USB controller to the first and second circuit paths during the first and second modes to control at least one transistor in the first and second circuit paths without providing another control signal from the USB controller to the first and second circuit paths during the first and second modes.

In Example 19, the subject matter of Example 18 may optionally include, providing power to a first pin of a USB connector during the first mode, wherein the node is coupled to a second pin of the USB connector, and the second pin includes a Configuration Channel pin of the USB connector.

In Example 20, the subject matter of Example 18 or Example 19 may optionally include, receiving power from a first pin of a USB connector during the second mode, wherein the node is coupled to a second pin of the USB connector, and the second pin includes a Configuration Channel pin of the USB connector.

The subject matter of Example 1 through Example 20 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
    a node to couple to a Configuration Channel pin of a Universal Serial Bus (USB) type-C connection;
    a first supply node;
    a second supply node;
    a first circuit path coupled to the node and the first supply node;
    a second circuit path coupled to the node and the second supply node; and
    a controller to provide a control signal to allow the first node to be electrically coupled to the first supply node during a USB host mode of the controller, and the controller to provide the control signal to allow the first node to be electrically coupled to the second supply node during a USB device mode of the controller, wherein the first circuit path includes a switch coupled between the node and the first supply node, the second circuit path includes a diode coupled between the node and the second supply node, the diode includes an anode and a cathode, the anode is coupled to a terminal of the switch through a portion of the first circuit path, and the cathode is coupled to the terminal of the switch through a circuit path between the terminal of the switch and the cathode.

2. The apparatus of claim 1, wherein the Configuration Channel pin includes a Configuration Channel CC1 pin of the USB type-C connection.

3. The apparatus of claim 1, wherein the Configuration Channel pin includes a Configuration Channel CC2 pin of the USB type-C connection.

4. An apparatus comprising:
    a node to couple to a Configuration Channel pin of a Universal Serial Bus (USB) type-C connection;
    a first supply node;
    a second supply node;
    a first circuit path coupled to the node and the first supply node;
    a second circuit path coupled to the node and the second supply node;
    a switch included in the first circuit path, the switch being coupled between the node and the first supply node; and
    a diode included in the second circuit path, the diode being coupled between the node and the second supply node, wherein the diode includes an anode and a cathode, the anode is coupled to a terminal of the switch through a portion of the first circuit path, and the cathode is coupled to the terminal of the switch through a circuit path between the terminal of the switch and the cathode.

5. The apparatus of claim 4, wherein the Configuration Channel pin includes a Configuration Channel CC1 pin of the USB type-C connection.

6. The apparatus of claim 4, wherein the Configuration Channel pin includes a Configuration Channel CC2 pin of the USB type-C connection.

7. The apparatus of claim 4, wherein the circuit path between the terminal of the switch and the cathode includes a resistor, the resistor includes a first terminal coupled to the terminal of the switch, and the resistor includes a second terminal coupled to the cathode of the diode.

8. An apparatus comprising:
    a node to couple to a Configuration Channel pin of a Universal Serial Bus (USB) type-C connection;
    a first supply node;
    a second supply node;
    a first circuit path coupled to the node and the first supply node;
    a second circuit path coupled to the node and the second supply node;
    a switch included in the first circuit path, the switch being coupled between the node and the first supply node; and
    a diode included in the second circuit path, the diode being coupled between the node and the second supply node, wherein the first circuit path includes an additional diode coupled between the switch and the node.

9. The apparatus of claim 8, further comprising a USB controller to turn on the switch during a USB host mode of the USB controller.

10. The apparatus of claim 9, further comprising a USB controller o turn off the switch during a USB device mode of the USB controller.

11. An apparatus comprising:
    a node to couple to a Configuration Channel pin of a Universal Serial Bus (USB) type-C connection;
    a first supply node;

a second supply node;
a first circuit path coupled to the node and the first supply node;
a second circuit path coupled to the node and the second supply node;
a switch included in the first circuit path, the switch being coupled between the node and the first supply node; and
a diode included in the second circuit path the diode being coupled between the node and the second supply node, wherein the first circuit path includes an additional diode coupled between the node and the first supply node.

12. The apparatus of claim 11, wherein the switch includes a transistor, and the transistor and the additional diode are coupled between the node and the first supply node.

13. An apparatus comprising:
a node to couple to a Configuration Channel pin of a Universal Serial Bus (USB) type-C connection;
a first supply node;
a second supply node;
a first circuit path coupled to the node and the first supply node;
a second circuit path coupled to the node and the second supply node;
a switch included in the first circuit path, the switch being coupled between the node and the first supply node;
a diode included in the second circuit path, the diode being coupled between the node and the second supply node, wherein the diode includes an anode and a cathode, the anode is coupled to a terminal of the switch through a portion of the first circuit path, and the cathode is coupled to the terminal of the switch through a circuit path between the terminal of the switch and the cathode;
a USB controller to turn on the switch during a first mode of the USB controller and to turn off the switch during a second mode of the USB controller;
a processor coupled to the USB controller; and
an antenna coupled to the processor.

14. The apparatus of claim 13, wherein the first mode includes a USB host mode.

15. The apparatus of claim 14, wherein the second mode includes a USB device mode.

16. The apparatus of claim 13, further comprising a circuit board, wherein the USB controller is located on the circuit board, and the switch is located on the circuit board and outside the USB controller.

17. The apparatus of claim 13, further comprising a circuit board, wherein the USB controller is located on the circuit board, and the diode is located on the circuit board and outside the USB controller.

* * * * *

UNITED STATES PATENT AND TRADEMARK OFFICE
CERTIFICATE OF CORRECTION

PATENT NO. : 10,204,068 B2
APPLICATION NO. : 15/901351
DATED : February 12, 2019
INVENTOR(S) : Nge et al.

Page 1 of 1

It is certified that error appears in the above-identified patent and that said Letters Patent is hereby corrected as shown below:

In the Claims

In Column 14, Line 62, in Claim 10, delete "o" and insert --to-- therefor

In Column 15, Line 5, in Claim 11, delete "node:" and insert --node;-- therefor

In Column 15, Line 9, in Claim 11, after "path", insert --,--

Signed and Sealed this
Seventh Day of December, 2021

Drew Hirshfeld
*Performing the Functions and Duties of the
Under Secretary of Commerce for Intellectual Property and
Director of the United States Patent and Trademark Office*